Oct. 19, 1954 W. F. MATHENY 2,692,004
APPARATUS FOR CRIMPING MALLEABLE STRIPS
Filed Oct. 31, 1952 5 Sheets-Sheet 1
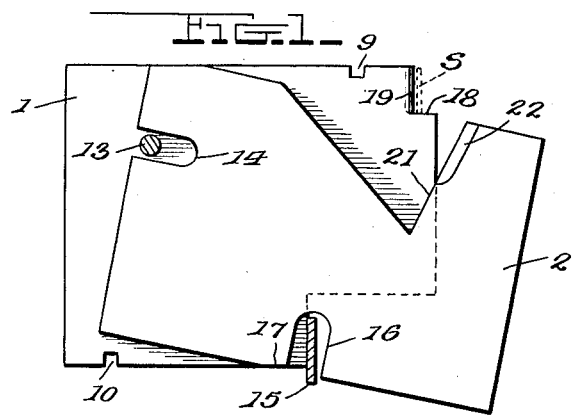
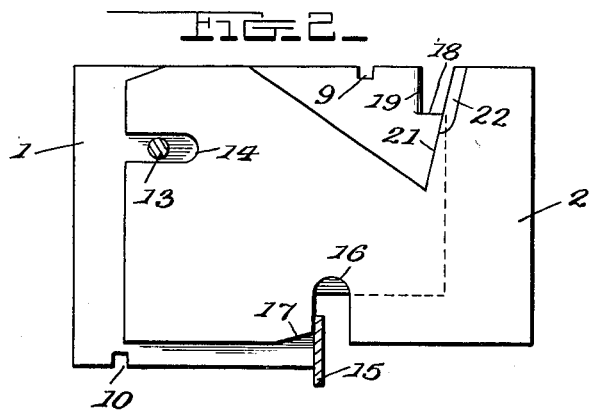
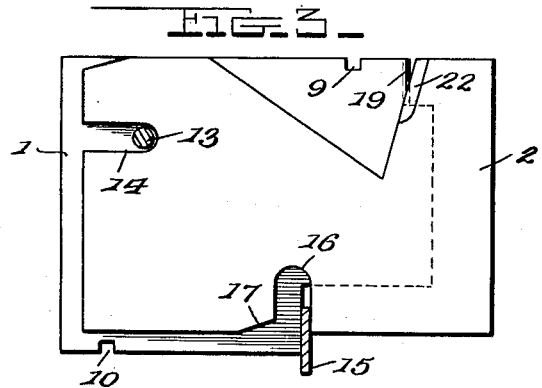
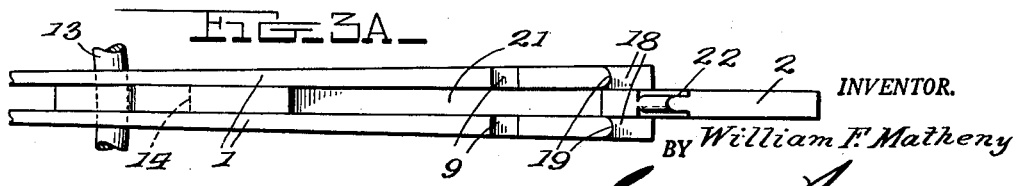
INVENTOR.
BY William F. Matheny
atty.

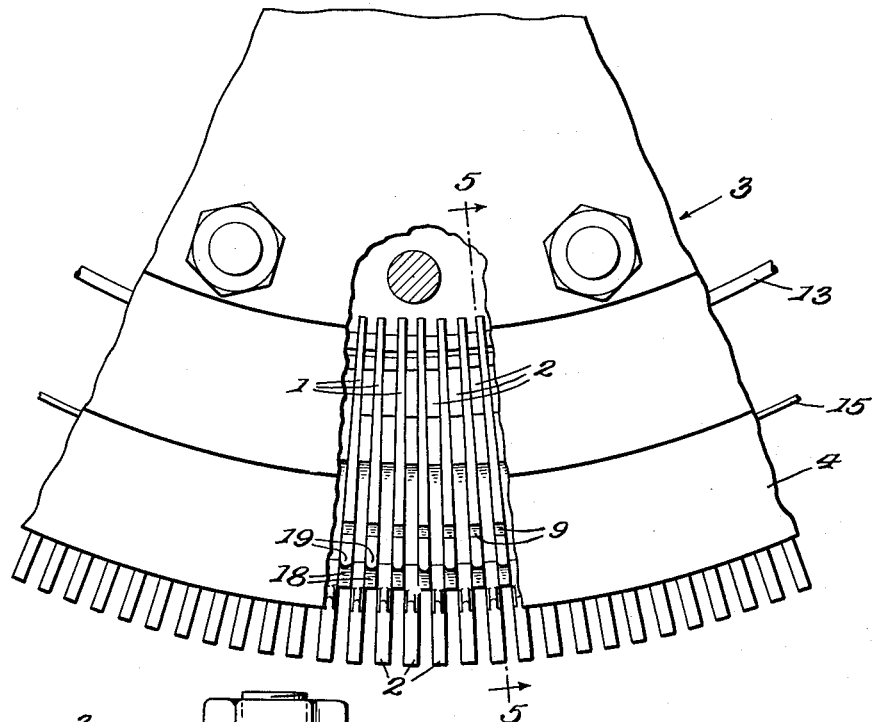
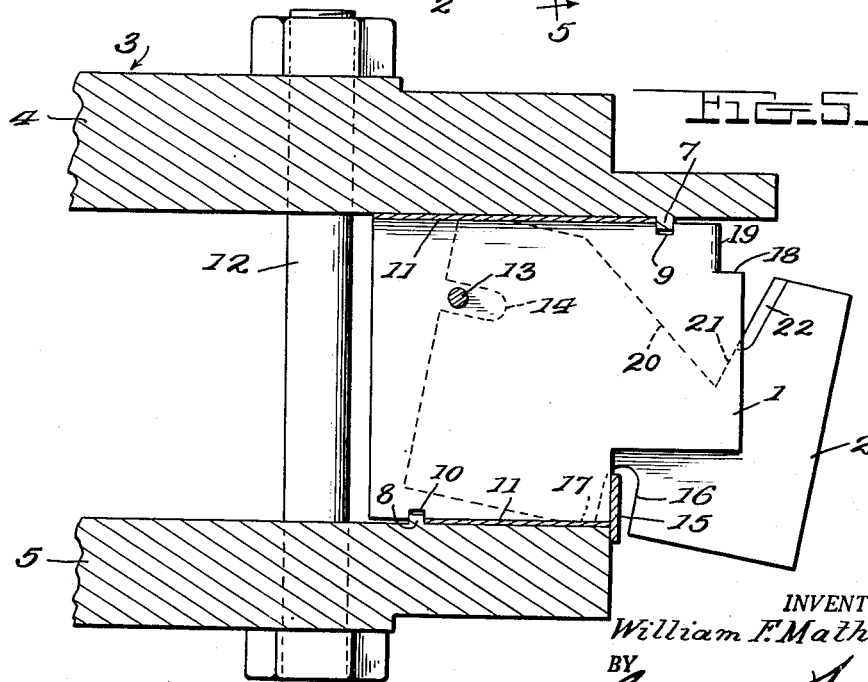

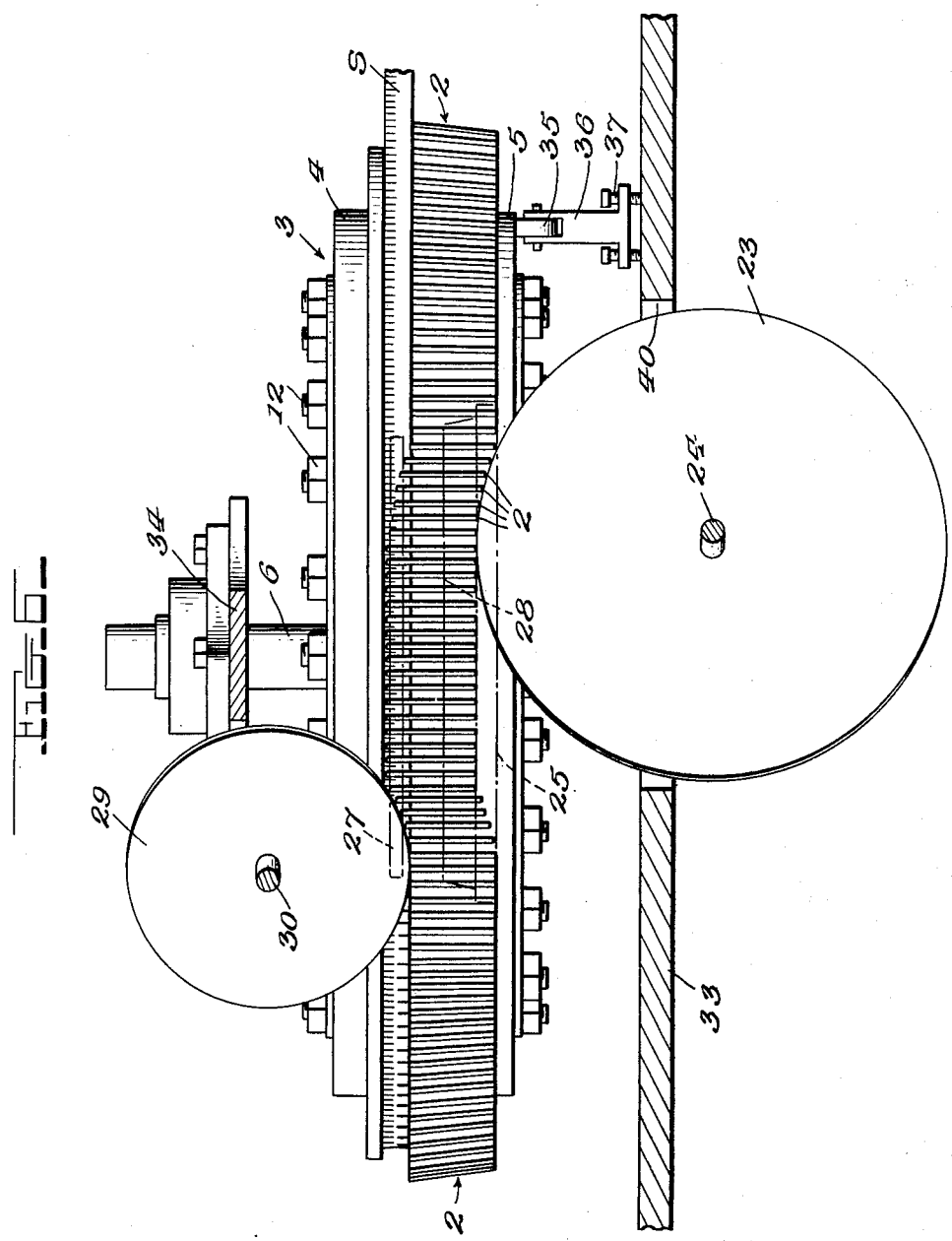

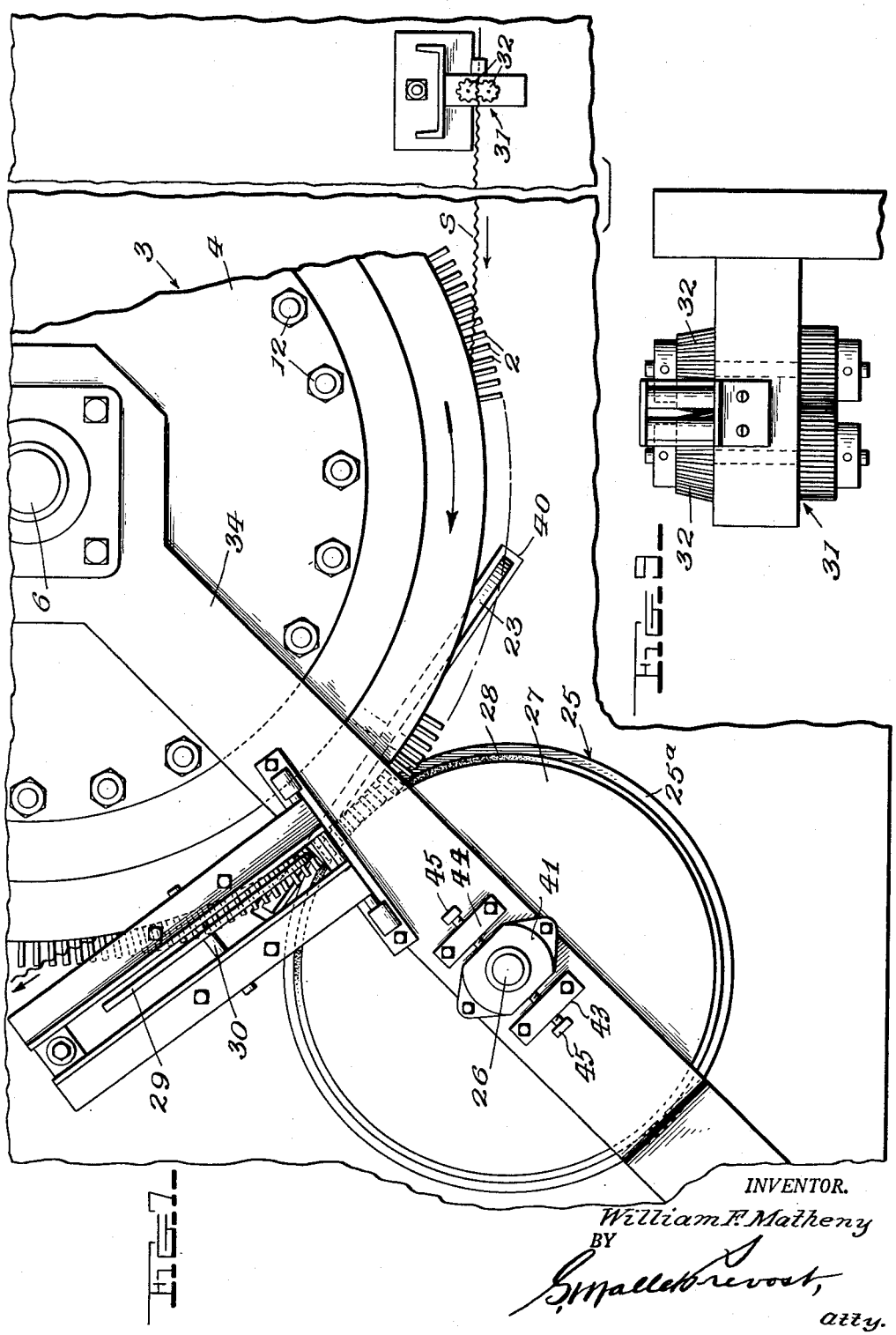

Oct. 19, 1954 W. F. MATHENY 2,692,004
APPARATUS FOR CRIMPING MALLEABLE STRIPS
Filed Oct. 31, 1952 5 Sheets-Sheet 5
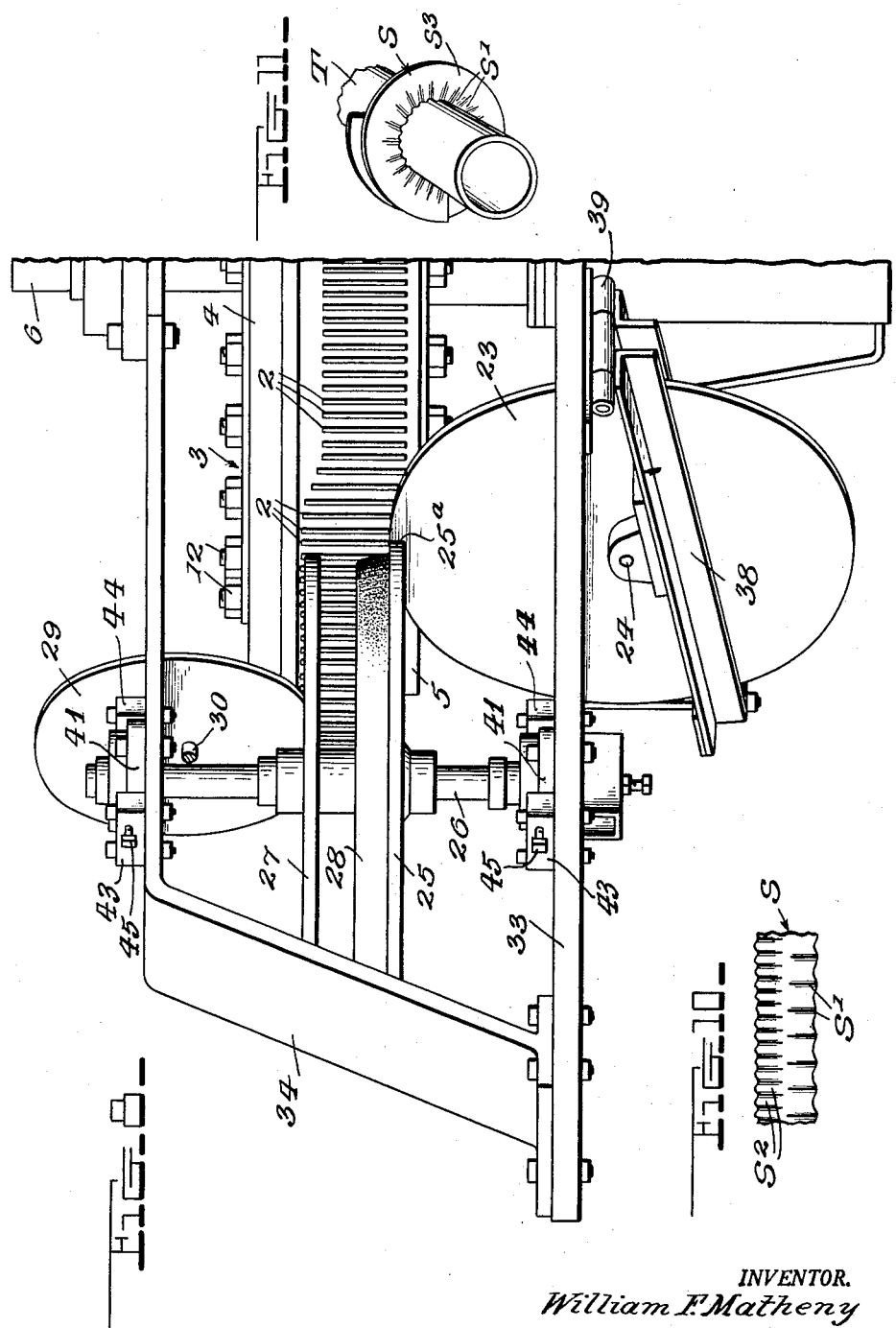
INVENTOR.
William F. Matheny
BY
G. Mallet Prevost,
atty.

Patented Oct. 19, 1954

2,692,004

UNITED STATES PATENT OFFICE 2,692,004

APPARATUS FOR CRIMPING MALLEABLE STRIPS

William F. Matheny, Tulsa, Okla.

Application October 31, 1952, Serial No. 318,018

18 Claims. (Cl. 153—68)

This invention consists in new and useful improvements in the art of crimping metal strips to form the helical fins of heat exchanger tubes and has for its object to provide a mechanism which will uniformly and progressively crimp a strip of metal in such manner as to simultaneously stretch one edge of the strip to facilitate its subsequent wrapping around a heat exchanger tube in helical form.

Heretofore, numerous crimping mechanisms have been designed for manufacturing the fins of heat exchanger tubes but these have in most instances, comprised opposed crimping gears between which the metal strips were caused to pass, the meshing gears causing the corrugations or crimping of the strips. This type of mechanism has been subject to numerous disadvantages. For example, there has been a certain degree of backlash with the use of opposed meshing gears which resulted in the shearing of the strip. Also, there has been a limitation to the spacing and depth of the crimps, due to the fixed relationship of the opposed gear teeth. Furthermore, with opposed gears, each tooth engages the strip between two opposed teeth with a rotary motion which has a tendency to work harden the copper or other metal of the strip.

With the present invention these disadvantages are overcome primarily by the replacement of the opposed gear principle, with a series of co-acting die plates which are mounted for rotation about a common axis and whose only relative movement is in adjacent planes radiating from the common axis. This structure affords a straight line die-action as distinguished from the rotary engagement of opposed gears.

Another object of the invention is to provide a strip crimping mechanism having a minimum of abrasive action on the metal strip during the crimping operation, as distinguished from the pronounced abrasive effect which necessarily results from the rotary movement of conventional opposed gears.

A further object of the invention is to provide a crimping mechanism wherein the uniformity and degree of crimping may be regulated and controlled more effectively than with the usual opposed rotary gears.

A still further object of the invention resides in the provision of a strip stabilizing device, adapted to control the movement of the strip immediately prior to the actual crimping operation and immediately following such operation, so as to avoid a creeping or shifting action of the strip such as occurs in the use of opposed gears.

Another object of the invention is to provide a strip crimping mechanism which, due to the straight line die action and the positive control of the cooperating die elements, affords a maximum of smoothness in operation.

Still another object of the invention is to provide a crimping mechanism which, by virtue of its construction and arrangement of parts, is adaptable for the purpose of crimping two or more strips in a simultaneous operation. This may be accomplished due to the use of a common chassis, carrying a series of annularly arranged, coacting die elements which may have associated therewith a plurality of die-actuating and control members, positioned at predetermined points around the periphery of the chassis, thus simultaneously crimping a plurality of strips as the common chassis rotates.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figures 1, 2 and 3 are detailed views of the coacting die plates, respectively in their inoperative, operative and operating positions.

Figure 3A is an enlarged view looking down on the top edges of the coacting die plates, to illustrate the shapes of the actual die portions thereof.

Figure 4 is a fragmentary plan view, partially broken away, illustrating the mounting means and the relative postions of the die plates.

Figure 5 is an enlarged fragmentary section of the die mounting chassis taken on line 5—5 of Figure 4.

Figure 6 is a view in side elevation, and to some extent diagrammatic, showing the chassis with die plates in place and the mechanisms for positioning, actuating and returning the dies to normal inactive position.

Figure 7 is a fragmentary plan view showing the relationship of the chassis and die actuating wheel.

Figure 8 is a side elevation of the structure shown in Figure 7, also to some extent diagrammatic.

Figure 9 is an enlarged detail of the pre-crimping mechanism.

Figure 10 is a detail view of a fragment of crimped strip, and

Figure 11 is a fragmentary perspective view of a strip which has been crimped, stretched and wrapped on a tube.

As will be seen from Figures 1 to 3 of the drawings, the die unit is made up of two series of alternately arranged die elements or plates 1 and 2, which are relatively thin and substantially rectangular in shape. The plates 1 forming one series, are tapered toward their inner ends, as shown in Figures 3A and 4, to facilitate their arrangement in a circular row, with the untapered plates 2 of the second series, interposed therebetween. The plates 1 are vertically fixed in a chassis, generally indicated by the numeral 3 and consisting of a pair of horizontally disposed, circular clamping heads 4 and 5, arranged in vertically spaced relation on a vertical shaft 6, as shown in Figure 6.

As best seen in Figure 5, the opposed inner faces of the heads 4 and 5 are provided with annular locating flanges 7 and 8 respectively, adapted to register with complementary recesses 9 and 10 in the adjacent horizontal edges of the die plates 1, gaskets 11 of any suitable soft material, being interposed between the edges of the plates 1 and the heads 4 and 5. A series of clamping bolts 12 secure the heads 4 and 5 in clamping engagement with the die plates 1, thus maintaining the annular arrangement of fixed die plates.

The second series of die plates 2 comprise the active elements of the set of dies and are slidably retained between the dies 1 for both vertical and horizontal movement. This is accomplished by employing a fixed, annular split swivel ring 13 which extends through annularly aligned openings in fixed plates 1 and is positioned for engagement with slots 14 in the inner vertical edges of each of the movable plates 2. Thus, the ring 13 serves both as a pivot point for vertical swinging movement of the plates 2 and, in cooperation with the slots 14, as a guide for the horizontal sliding movement.

Horizontal movement of the die plates 2 is limited by means of a keeper ring 15, fixed to the periphery of the lower chassis head 5 and projecting upwardly therefrom for engagement with the slots 16 in the lower edge of each plate 2. The adjacent corners of the overlying fixed plates 1, being cut out to accommodate the keeper ring 15, as seen in Figure 5.

As seen in Figures 4 and 5, the movable plates 2 project radially beyond the corresponding edges of the fixed plates 1, for purposes hereinafter described, and their vertical movement about the swivel ring 13 is limited in an upward direction, by contact of the upper edge of each plate, with the inner face of the head 4. The lower edge of each plate 2, immediately adjacent the slot 16, is mitered as at 17 for abutment with the upper face of the lower head 5, to limit the downward movement of the plates 2, to the position shown in Figures 1 and 5. This is the position of the movable plates 2 both for receiving and releasing the strip to be crimped, as will later appear.

The two sets of die plates 1 and 2 are designed to coact in crimping a strip of metal between opposed die surfaces. The fixed die plates 1 are provided at their upper outer corners with recesses forming strip positioning shoulders 18 on which a strip of metal stock is held while the die action takes place, the vertical edge 19 of each recess being rounded and shaped to form the fixed elements of the die assembly.

The complementary movable die plates 2 are deeply notched as at 20 to clear a strip of metal positioned on the shoulders 18 and the outer edge 21 of each notch is directed at an upward and outward angle to define the angular relationship of the coacting die surfaces.

As shown in Figures 1 to 3A, the upper extremity of the outer edge 21 of each notch 20 is shaped at 22 to form the active surface of the die. The thickness of the die plate 2 is reduced along each side of the die surface at 22, to allow clearance for the strip of metal being crimped between the opposed sets of dies 1 and 2. This will best be seen in Figure 3A.

The normal, inoperative position of the die plates, is as shown in Figure 1 and the first step in the operation of the system, assuming that a strip S (dotted lines Fig. 1) has been advanced and rests edgewise on the shoulder 18 of the fixed die plate 1, is to elevate the movable dies 2 to the operative position shown in Figure 2. This is progressively accomplished by causing the clockwise rotation of the chassis 3, in the direction of the arrow in Figure 7, by any suitable mechanism (not shown), so that the lower edges of the inactive plates 2 progressively engage the periphery of a positioning wheel 23 as shown in Figure 6. This wheel is freely rotatable on a horizontal shaft 24 and is of a diameter such as to elevate the plates 2 to the level of the top surface of a circular die-supporting disk 25, mounted on a vertical shaft 26. Thus, as seen in Figure 8, as the chassis 3 rotates, the plates 2 are progressively lifted by wheel 23 and deposited on the edge 25ª of disc 25, assuming the relative position shown in Figure 2.

On the same axis or shaft 26 and spaced above the disk 25, is a die-pressing wheel 27, located in line for engagement by its periphery, with the outer vertical edges of the movable die plates 2, as the chassis is rotated. As shown in Figure 7, the periphery of this die pressing wheel progressively engages the dies 2 and causes them to slide horizontally inwardly so that the die surfaces 22 engage a strip resting on shoulder 18, crimping the strip between the die surfaces 19 of the spaced stationary plates 1 and the shaped die surface 22 of movable plates 2, assuming the relative position shown in Figure 3.

At this point, it may be noted that due to the angle of the approach between the vertical die surface 19 of the fixed dies and the angular die surface 22 of the movable dies, as shown in Figure 3, a strip engaged therebetween, is crimped and stretched along its lower edge, but remains unaffected along its upper edge. Thus, the degree of stretching of this strip can be predetermined to form the desired radius of a helical fin.

As shown in Figure 8, a circular cushion 28, of slightly less diameter than disk 25, is superimposed on the latter for peripheral engagement with the vertical edges of the plates 2, during such time as they are supported on the edge 25ª, of the disk 25. The purpose of this cushion is to maintain a constant pressure on the elevated plates during the crimping operation so that the edges of the elevated plates 2 are embedded in the periphery of the cushion, which stabilizes the plates and prevents creeping of the strip to the crimping area. In other words, a number of plates both in advance of and succeeding those actually in crimping engagement with the strip, are resiliently pressed against the strip by the cushion 28, to stabilize the progress of the strip.

To return the elevated plates 2 to normal inoperative position after the criming operation, and after they have progressed beyond the periphery of disk 25, a vertical plate return disk 29 is freely mounted on a horizontal shaft 30. As the chassis 3 rotates, the periphery of the disk 29 progressively engages the top edges of the plates 2 as shown in Figure 6, and swivels them downwardly about the axis of ring 13, to the normal inoperative position shown in Figure 1.

Summarizing the three steps above described, a strip of metal is advanced as it engages the periphery of the rotating chassis 3 and as the movable plates 2 are normally in their lowered position as shown in Figure 1, the strip S is permitted to enter the die area of the fixed plates 1 and rest upon the shoulders 18, without obstruction by the movable die plates 2. As the chassis continues to rotate, the movable dies 2 are progressively elevated to the position shown in Figure 2, placing the die surfaces of these movable plates in line for cooperation with the adjacent die surfaces of the fixed plates 1. Then as the chassis continues to rotate, the movable die plates 2 are progressively forced inwardly to the position shown in Figure 3, where the actual crimping operation is accomplished. Following this crimping operation the movable die plates are again returned to their normal positions as shown in Figure 1, which clears the way for the disengagement of the crimped strip from the supporting shoulders 18, and a repetition of the cycle just described.

In the actual operation of this mechanism, it is preferable to apply a preliminary crimp along one edge of the strip, opposite to the edge to be finally crimped and stretched. The purpose of the preliminary crimping is to form a series of base crimps which facilitate the engagement and fastening of the strip to the tube on which it is later to be wrapped in helical form. This is accomplished by a pre-crimper, generally indicated by the numeral 31, which is arranged anterior to the main crimping mechanism and consists of a pair of opposed crimping gears 32. These gears provide along one edge of the strip S, a series of relatively slight preliminary crimps and leave the opposite edge of the strip unaffected. At a point between the pre-crimper 31 and the main crimping mechanism, the strip S is reversed so that its pre-crimped edge is on top and the unaffected edge is presented to the shoulders 18 of the fixed dies 1, as the chassis 3 advances.

As the lowered plates 2 progressively approach the periphery of the die positioning wheel 23 they are rocked about the swivel ring 13, to the position shown in Figure 2, this upward movement being limited by engagement of the upper edges of the plates 2 with the under face of the top chassis head 4. The die plates are now in position for die action, with the opposed die surfaces 19 and 22 aligned for operative engagement with the strip S lying on shoulder 18.

As the chassis continues to rotate and with it the series of die plates, the outer vertical edges of movable plates 2 are progressively brought into engagement with the periphery of the die pressing wheel 27 which is freely rotatable about its shaft 26. Simultaneously the lower edges of the elevated die plates 2 are deposited upon the outer edge 25ª of the die supporting disk 25 as shown in Figure 8, which continues to support the dies in their elevated positions until after they have passed the periphery of the die pressing wheel 27. During the course of this movement the die pressing wheel 27 causes the dies 2 to slide inwardly, guided by the slot 14, on the swivel bar 13 until they reach the full crimping position shown in Figure 3. This inward movement is finally limited by the keeper ring 15.

The chasiss 3 continues to rotates and the die plates 2 travel out of engagement with the die supporting disk 25, but due to relatively tight sliding engagement of these plates with the alternate fixed plates 1, the plates 2 remain in their elevated positions although unsupported at their lower edges. In order to return the plates 2 to their normal inoperative positions, both for the purpose of releasing the crimped strip and conditioning the die elements to receive a new portion of the strip as the chassis completes a cycle, the return disk 29 engages the upper edges of the die plates 2 as shown in Figure 6, and returns them to normal position as in Figure 1.

At this point, the strip S, traveling in the position of the arrows shown in Figure 7, leaves the periphery of the die chassis and is fed to a fin wrapping machine (not shown) which forms a separate invention. As the strip S is released from the crimping mechanism, it is in the form shown in Figure 10, the base crimp $S^1$ having been applied by the pre-crimping mechanism 31 and the stretching crimps $S^2$ having been applied by the main crimping mechanism just described.

As before indicated, the crimps $S^2$ are applied in such a manner as to stretch or flatten the metal along adjacent edge of the strip S, so that when it is wrapped in helical form on the tube T shown in Figure 11, the crimped edge $S^2$ is stretched out as at $S^3$ and flattened to form a perfectly smooth edge of greater length than the base crimped edge $S^1$ which facilitates the formation of the helical fin when applied to the tube T.

Any suitable structures may be employed for supporting the various elements of this crimping mechanism. For example, a base or platform 33 is provided with an overhead yoke or frame 34 which supports the main shaft 6 of the chassis 3, as well as the shaft 26 for the die-operating disk 27, the stabilizing disk 28 and the die-supporting disk 25.

To better support the weight of the chassis 3, I preferably provide a series of rollers 35 mounted in vertical brackets 36, arranged in an annular path around the underside of the chassis 3, as shown in Figure 6. These may be adjusted vertically by adjusting screws 37 so as to insure the uniform support and operation of the chassis 3.

The die-elevating disk 23 is supported by its pivot 24 on a frame member 38 which is hinged at 39 to the base 33. This provides for adjustment of the peripheral engagement of the disk 23 with the lower edges of the movable die plates 2 and will best be seen in Figure 8. The disk 23 is adapted to be moved vertically through a slot 40, arranged in the base 33 as shown in Figures 6 and 7.

As previously indicated, one of the advantages of this particular arrangement lies in the fact that the common die-chassis 3, with its two series of coacting dies, may be employed for simultaneously crimping two or more strips, thus greatly increasing the rate of production of helical fin tubing. This may be accomplished by employing additional die-actuating and control units, to the extent permitted by the periphery of the chassis 3. Thus, if two strips were to be crimped simultaneously, an additional set of die-control and actuating disks similar to 23, 25, 27 and 29, might be employed on the opposite side of the periphery of the chassis 3, for simultaneous operation with those shown in Figure 7.

It is desirable to provide for the adjustment of the proximity of the die pressing wheel 27 to the periphery of the chassis 3, so as to regulate the extent of stretching or crimping by the dies. In Figures 7 and 8 I have shown one means for accomplishing this adjustment, wherein the vertical shaft 26 is supported at its upper and lower ends in adjustable bearing plates 41 and 42, respectively. The upper bearing plate 41 lies on top of the overhead yoke 34 while the lower bearing plate 42 rests on the upper face of the base 33, and in each instance the plate is laterally shiftable between spaced abutments 43 and 44. Each abutment is transversely drilled and threaded to receive adjusting bolts 45, the inner ends of which engage the adjacent sides of the respective bearing plates. Thus, the position of the axis of which 27 and cushion 28 may be shifted by regulating the bolts 45, to cause a lesser or greater degree of crimping, as desired.

From the foregoing it is believed that my invention may be readily understood by those skilled in the art, without further description, it being borne in mind that numerous changes may be made in the details of construction without departing from the spirit of the invention as set forth in the following claims.

I claim:

1. Apparatus for forming helical worms from malleable strip material, comprising an annular die supporting member, rotatable about a vertical axis, a series of fixed die plates, carried by and rotatable with said member, said plates being radially disposed adjacent the periphery of said member and alternately spaced by a second series of die plates, carried by and rotatable with said member and movable both vertically and horizontally within predetermined limits, each of said fixed die plates having its outer vertical edge recessed to form a horizontal strip supporting shoulder and an outwardly directed vertical die element above said shoulder, each of said movable die plates having a portion of its upper edge recessed between its longitudinal extremities, a rearwardly directed die element formed on the forward vertical edge of said recess and arranged at an upwardly and outwardly diverging angle with respect to the vertical fixed die elements, means supporting said movable plates in their lowermost, inactive positions, means for rotating said die supporting member, a die positioning device arranged in the path of said movable die plates and adapted to progressively elevate the latter to present the coacting die elements in opposed relation, a die advancing member operable to engage the outer vertical edges of said movable die plates and progressively shift them toward the axis of said supporting member, to force their respective die elements into operative position between adjacent fixed die elements, and means for returning said movable die elements to inactive positions.

2. Apparatus as claimed in claim 1, wherein said fixed die plates are substantially wedge-shaped in horizontal cross-section to facilitate their annular arrangement in said supporting member.

3. Apparatus as claimed in claim 2, wherein said movable die plates are maintained in frictional sliding engagement between the respective fixed die plates.

4. Apparatus for forming helical worms from malleable strip material, comprising an annular die supporting member, rotatable about a vertical axis, a series of fixed die plates, carried by and rotatable with said member, said plates being radially disposed adjacent the periphery of said member and alternately spaced by a second series of die plates carried by and rotatable with said member and movable both vertically and horizontally within predetermined limits, each of said fixed die plates having its outer vertical edge recessed to form a horizontal strip supporting shoulder, and an outwardly directed vertical die element above said shoulder, each of said movable die elements having a portion of its upper edge recessed between its longitudinal extremities, a vertically directed die element formed on the forward edge of said recess and arranged at an upwardly and outwardly diverging angle with respect to the vertical fixed elements, means supporting said movable die plates in their lowermost, inactive positions, means for rotating said die supporting member, a die positioning disk arranged with its periphery in the path of said movable die plates and adapted to progressively elevate the latter to present the coacting die elements in opposed relation, a die advancing disk operable for peripheral engagement with the outer vertical edges of said movable die plates to progressively shift them toward the axis of said supporting member, to force their respective die elements into operative position between adjacent fixed die elements, and means for returning said movable die elements to inactive position.

5. Apparatus as claimed in claim 4 wherein said last means comprises a return disk arranged for peripheral engagement with the upper edges of said movable plates to progressively return them to inactive position.

6. Apparatus for forming helical worms from malleable strip material, comprising an annular die-supporting member, rotatable about a vertical axis, a series of fixed die plates, carried by and rotatable with said member, said plates being radially disposed adjacent the periphery of said member and alternately spaced by a second series of die plates, carried by and rotatable with said member and movable both vertically and horizontally within predetermined limits, each of said fixed die plates having an outwardly directed vertical die element on its outer vertical edge, each of said movable die plates having a portion of its upper edge recessed between its longitudinal extremities, a rearwardly directed die element formed on the forward vertical edge of said recess and adapted to coact with said outwardly directed die element, means supporting said movable plates in their lowermost, inactive positions, means for rotating said supporting member, a die positioning device arranged in the path of said movable die plates and adapted to progressively elevate the latter to present the coacting die elements in opposed relation, a die-advancing member operable to engage the outer vertical edges of said movable die plates and progressively shift them toward the axis of said supporting member, to force their respective die elements into operative position between adjacent fixed die elements, and means for returning said movable die elements to inactive position.

7. Apparatus for forming helical worms from malleable strip material, comprising an annular die-supporting member, rotatable about a vertical axis, a series of fixed die plates, carried by and rotatable with said member, said plates being radially disposed adjacent the periphery of said member and alternately spaced by a second series of die plates, carried by and rotatable with said member and movable both vertically and horizontally within predetermined limits, each of said fixed die plates having an outwardly directed vertical die surface, each of said movable die plates having a complementary inwardly directed die surface, means supporting said movable die plates in the lowermost, inactive positions, means for rotating said die-supporting member, a die-positioning disk arranged with its periphery in the path of said movable die plates and adapted to progressively elevate the latter to present the coacting die plates in opposed relation, a die-advancing disk operable for peripheral engagement with the outer vertical edges of said movable die plates to progressively shift them toward the axis of said supporting member, to force their respective die surfaces into operative engagement with adjacent fixed die surfaces, and means for returning said movable die plates to inactive position.

8. Apparatus as claimed in claim 7, including means for supporting the elevated die plates throughout a portion of the rotation of said annular die-supporting member.

9. Apparatus as claimed in claim 7, including means for stabilizing the movable die plates, anterior and posterior to the actual crimping engagement, to prevent creeping of the strip.

10. Apparatus as claimed in claim 7, including a second set of die-positioning and die-advancing members arranged at a different location adjacent the periphery of said die-supporting member.

11. Apparatus as claimed in claim 7, wherein said die-advancing disk is rotatably supported in laterally shiftable bearings and means for adjusting the positions of said bearings to regulate the peripheral engagement of said disk with said movable dies.

12. Apparatus as claimed in claim 7, including means for adjusting the relationship of the axis of said die-advancing disk with respect to the axis of said chassis, to vary the peripheral engagement of the disk with the movable dies.

13. In apparatus for crimping metal strip, a die mechanism comprising a first set of fixed, consecutively aligned die elements, a second set of movable die elements, complementary to said fixed die elements but normally offset with respect thereto, said second set of die elements being capable of pivotal movement into opposed relation to said fixed die elements and reciprocal sliding movement into and out of operative engagement with the latter, means for supporting a strip of metal adjacent said fixed die elements, first means for pivoting said movable die elements into opposed relation to said fixed die elements with said strip interposed therebetween, second means for sliding said movable die elements into operative engagement with said strip and fixed die elements, and third means for returning said movable die elements to normal offset position.

14. In apparatus for crimping metal strip, a die mechanism comprising a first set of fixed consecutively aligned die elements, a second set of movable die elements complementary to said fixed die elements but normally offset with respect thereto, said second set of die elements being capable of individual pivotal movement into opposed relation to said fixed die elements and reciprocal sliding movement into and out of operative engagement with the latter, means for supporting a strip of metal adjacent said fixed die elements, first means for successively pivoting said movable die elements to progressively present them in opposed relation to said fixed die elements with said strip interposed therebetween, second means for successively sliding said movable die elements into operative engagement with said strip and fixed die elements, and third means for returning said movable die elements to normal offset position.

15. In apparatus for crimping metal strip, a die mechanism comprising a first set of fixed die elements positioned around a common axis, a second set of coaxially arranged movable die elements, complementary to said first die elements but normally offset with respect thereto, said second set of die elements being capable of pivotal movement into opposed relation to said fixed die elements and reciprocal sliding movement into and out of operative engagement with the latter, means for supporting a strip of metal adjacent said fixed die elements, first means for pivoting said movable die elements into opposed relation to said fixed die elements with said strip interposed therebetween, second means for sliding said movable die elements into operative engagement with said strip and fixed die elements, and third means for returning said movable die elements to normal offset position.

16. In apparatus for crimping metal strip, a die mechanism comprising a first set of fixed die elements, positioned around a common axis, a second set of coaxially arranged movable die elements, complementary to said fixed die elements but normally offset with respect thereto, said second set of die elements being capable of individual pivotal movement into opposed relation to said fixed die elements and reciprocal sliding movement into and out of operative engagement with the latter, means for supporting a strip of metal adjacent said fixed die elements, first means for successively pivoting said movable die elements to progressively present them in opposed relation to said fixed die elements with said strip interposed therebetween, second means for successively sliding said movable die elements into operative engagement with said strip and fixed die elements, and third means for returning said movable die elements to normal offset position.

17. Apparatus as claimed in claim 16, wherein both of said sets of die elements are mounted on and rotatable with a common die chassis, adjacent its periphery, said first, second and third means being arranged in the path of movement of said movable die elements, and means for rotating said chassis.

18. Apparatus as claimed in claim 16, wherein both of said sets of die elements are mounted on and rotatable with a common die chassis, adjacent its periphery, means for rotating said chassis, said die pivoting means, die sliding means and die returning means being respectively arranged at successive points adjacent the periphery of said chassis for progressive engagement with said movable die elements as the chassis rotates.

References Cited in the file of this patent

UNITED STATES PATENTS

| Number | Name | Date |
|---|---|---|
| 284,749 | McCreary et al. | Sept. 11, 1883 |
| 336,656 | McCreary et al. | Feb. 23, 1886 |
| 1,769,950 | Hensley | July 8, 1930 |
| 2,484,390 | Thorpe et al. | Oct. 11, 1949 |